(12) United States Patent
Morier et al.

(10) Patent No.: US 11,079,861 B2
(45) Date of Patent: *Aug. 3, 2021

(54) DUAL-MODE OPTICAL INPUT DEVICE

(71) Applicant: Logitech Europe S.A., Lausanne (CH)

(72) Inventors: François Morier, Romanel-sur-Lausanne (CH); Olivier Theytaz, Savigny (CH)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,369

(22) Filed: Feb. 7, 2020

(65) Prior Publication Data

US 2020/0319724 A1 Oct. 8, 2020

Related U.S. Application Data

(63) Continuation of application No. 15/659,970, filed on Jul. 26, 2017, now Pat. No. 10,592,007.

(51) Int. Cl.
*G06F 3/0354* (2013.01)
*G06F 3/03* (2006.01)
*G06F 3/038* (2013.01)
*G06F 1/3234* (2019.01)

(52) U.S. Cl.
CPC ........ *G06F 3/03543* (2013.01); *G06F 1/3259* (2013.01); *G06F 3/0304* (2013.01); *G06F 3/0317* (2013.01); *G06F 3/0383* (2013.01)

(58) Field of Classification Search
CPC .. G06F 3/03543; G06F 1/3259; G06F 3/0317; G06F 3/0383; G06F 3/0304; G06T 7/20
See application file for complete search history.

(56) References Cited

U.S. PATENT DOCUMENTS 10,592,007 B2 * 3/2020 Morier ................. G06F 1/3259
2016/0098100 A1 * 4/2016 Chang ................. G06F 3/0317
345/166

* cited by examiner

*Primary Examiner* — Andrew Sasinowski
(74) *Attorney, Agent, or Firm* — Kilpatrick Townsend & Stockton LLP

(57) ABSTRACT

In certain embodiments, an input device includes a housing, a processor disposed in the housing, and an image sensor to track a movement of the input device with respect to an underlying surface. The image sensor includes a pixel array and operates in two modes of operation including a first mode of operation where the processor causes the image sensor to utilize a first plurality of pixels in the pixel array when tracking the movement of the input device or a second mode of operation where the processor causes the image sensor to utilize a second plurality of pixels in the pixel array when tracking the movement of the input device, where the second plurality of pixels has fewer pixels than the first plurality of pixels.

20 Claims, 7 Drawing Sheets

DUAL-MODE OPTICAL INPUT DEVICE

CROSS REFERENCE PARAGRAPH FOR PRIORITY

This application is continuation of U.S. Non-Provisional application Ser. No. 15/659,970, filed on Jul. 26, 2017, and titled "DUAL-MODE OPTICAL INPUT DEVICE," which is hereby incorporated by reference in its entirety for all purposes.

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktops, laptops, tablets and "phablet" computers, smart phones, personal digital assistants, wearable devices (e.g., smart watches, glasses), virtual reality (VR) and/or augmented reality (AR) systems, and the like.

Computer mice, in particular, have undergone significant improvements in functionality, accuracy, ergonomics, and versatility. Earlier designs, including the "mechanical mouse," used a rubber ball coupled to two freely rotating rollers situated 90 degrees from one another to roll along an underlying surface. The first roller detects forward-backward motion of the mouse and the second roller detects left-right motion, with each roller sharing the same shaft as a corresponding encoder wheel with slotted edges that interrupt infra-red light beams generate electrical pulses that can be translated to wheel movement. Mechanical mice were notorious for picking up dirt, unpredictable tracking, and needing frequent disassembly and cleaning.

Contemporary mice may include surface-independent optical mice using optoelectronic sensors to compare successive images of the underlying surface on which the computer mouse operates to interpret movement. Technological improvements have allowed optical mice to be used along varied types of surfaces (e.g., table tops, paper, glass, etc.) without the need for a special mouse pad. Optical mice typically employ light-emitting diodes (LEDs) and/or laser (e.g. coherent) light and an imaging array of photodiodes to detect movement relative to the underlying surface, which has proven to be much more reliant, robust, and accurate than their mechanical counterparts. Despite these improvements, broader-use designs are needed.

BRIEF SUMMARY

Certain embodiments may include an input device comprising a housing, one or more processors disposed in the housing, and a single image sensor, disposed in the housing and controlled by the one or more processors, to track a movement of the input device with respect to an underlying surface, the image sensor including a pixel array, and the image sensor to operate in two modes of operation. The two modes of operation can include a first mode of operation where the one or more processors cause the image sensor to utilize a first plurality of pixels in the pixel array when tracking the movement of the input device with respect to the underlying surface or a second mode of operation where the one or more processors cause the image sensor to utilize a second plurality of pixels in the pixel array when tracking the movement of the input device with respect to the underlying surface, where the second plurality of pixels has fewer pixels processed (utilized) than the first plurality of pixels. In some cases, tracking the movement of the input device with respect to the underlying surface can be characterized by a frame rate, such that when in the first mode of operation, the frame rate operates over a first range of frequencies, and when in the second mode of operation, the frame rate operates over a second range of frequencies. The second range of frequencies can have a narrower bandwidth than the first range of frequencies. For example, the first range of frequencies can be between 1 KHz and 30 KHz, and the second range of frequencies can be between 100 Hz and 10 KHz.

In some embodiments, when the input device is placed in the first mode of operation, a first plurality of memory slots may be used to correlate movement of the input device with respect to the underlying surface and when the input device is placed in the second mode of operation, a second plurality of memory slots can be used to correlate movement of the input device with respect to the underlying surface, where the first plurality of memory slots may be a greater number of memory slots than the second plurality of memory slots. In some implementations, the first plurality of memory slots can include four or more memory slots, and the second plurality of memory slots can include three or less memory slots. The input device may communicate with a host computing device via a first communication protocol when in the first mode of operation, and the input device may communicate with the host computing device via a second communication protocol when in the second mode of operation, according to certain embodiments. In some cases, the first communication protocol may have a first report rate of less than 5 ms per report, and the second communication protocol may have a second report rate of greater than 5 ms per report.

In certain embodiments, an input device may include a housing, one or more processors disposed in the housing, and an image sensor, disposed in the housing and controlled by the one or more processors, to track a movement of the input device with respect to an underlying surface, where tracking the movement of the input device with respect to the underlying surface may be characterized by a frame rate. In some cases, the image sensor can operate in two modes of operation including a first and second mode of operation. In the first mode of operation, the frame rate may operate over a first range of frequencies, and a first plurality of memory slots are used to correlate movement of the input device with respect to the underlying surface. In the second mode of operation, the frame rate can operate over a second range of frequencies and a second plurality of memory slots may be used to correlate movement of the input device with respect to the underlying surface. In some cases, the first range of frequencies can be between 1 KHz and 30 kHz, and the second range of frequencies can be between 100 Hz and 10 KHz, although other ranges for the first and second ranges of frequencies may be used.

In further embodiments, the first plurality of memory slots can include four or more memory slots, and the second plurality of memory slots can include three memory slots. In some cases, the image sensor can include a pixel array, where when in the first mode of operation the one or more processors can cause the image sensor to utilize a first plurality of pixels in the pixel array when tracking the movement of the input device with respect to the underlying surface and when in the second mode of operation the one or more processors can cause the image sensor to utilize a second plurality of pixels in the pixel array when tracking the movement of the input device with respect to the underlying surface. In some embodiments, the second plurality of pixels can have fewer pixels than the first plurality of pixels. The input device may communicate with a host computing device via a first communication protocol when in the first mode of operation, and a second communication protocol when in the second mode of operation. The first communication protocol can have a first report rate of less than 5 ms per report, and the second communication protocol can have a second report rate of greater than 5 ms per report, although other report rates are contemplated, as would be understood by one of ordinary skill in the art.

In certain embodiments, a method for operating an input device includes controlling, by one or more processors, an image sensor disposed in the input device to track a movement of the input device with respect to an underlying surface, the image sensor including a pixel array, and receiving an input signal to place the input device in one of a first mode of operation or a second mode of operation. When the input device is placed in the first mode of operation, the method can include causing the image sensor to utilize a first plurality of pixels in the pixel array when tracking the movement of the input device with respect to the underlying surface, and when the input device is placed in the second mode of operation, the method can include causing the image sensor to utilize a second plurality of pixels in the pixel array when tracking the movement of the input device with respect to the underlying surface, where the second plurality of pixels has fewer pixels than the first plurality of pixels. In some embodiments, tracking the movement of the input device includes operating the image sensor according to a frame rate, where when in the first mode of operation, the method further can include operating the frame rate over a first range of frequencies, and when in the second mode of operation, the method can further include operating the frame rate over a second range of frequencies, the first range of frequencies being different from the second range of frequencies.

In further embodiments, when in the first mode of operation, the method can include utilizing a first plurality of memory slots to correlate movement of the input device with respect to the underlying surface, and when in the second mode of operation, the method can include utilizing a second plurality of memory slots to correlate movement of the input device with respect to the underlying surface, where the first plurality of memory slots is a greater number of memory slots than the second plurality of memory slots. In some cases, the first plurality of memory slots can include four or more memory slots, and the second plurality of memory slots can include three or less memory slots. The method can further include communicating with a host computing device via a first communication protocol when in the first mode of operation, and communicating with the host computing device via a second communication protocol when in the second mode of operation. In some implementations, the first communication protocol can have a first report rate of less than 5 ms per report, and the second communication protocol can have a second report rate of greater than 5 ms per report. One of ordinary skill in the art would understand the many variations, modifications, and alternative embodiments thereof.

BRIEF DESCRIPTION OF THE DRAWINGS

The detailed description is set forth with reference to the accompanying figures.

DETAILED DESCRIPTION

Figure 1:
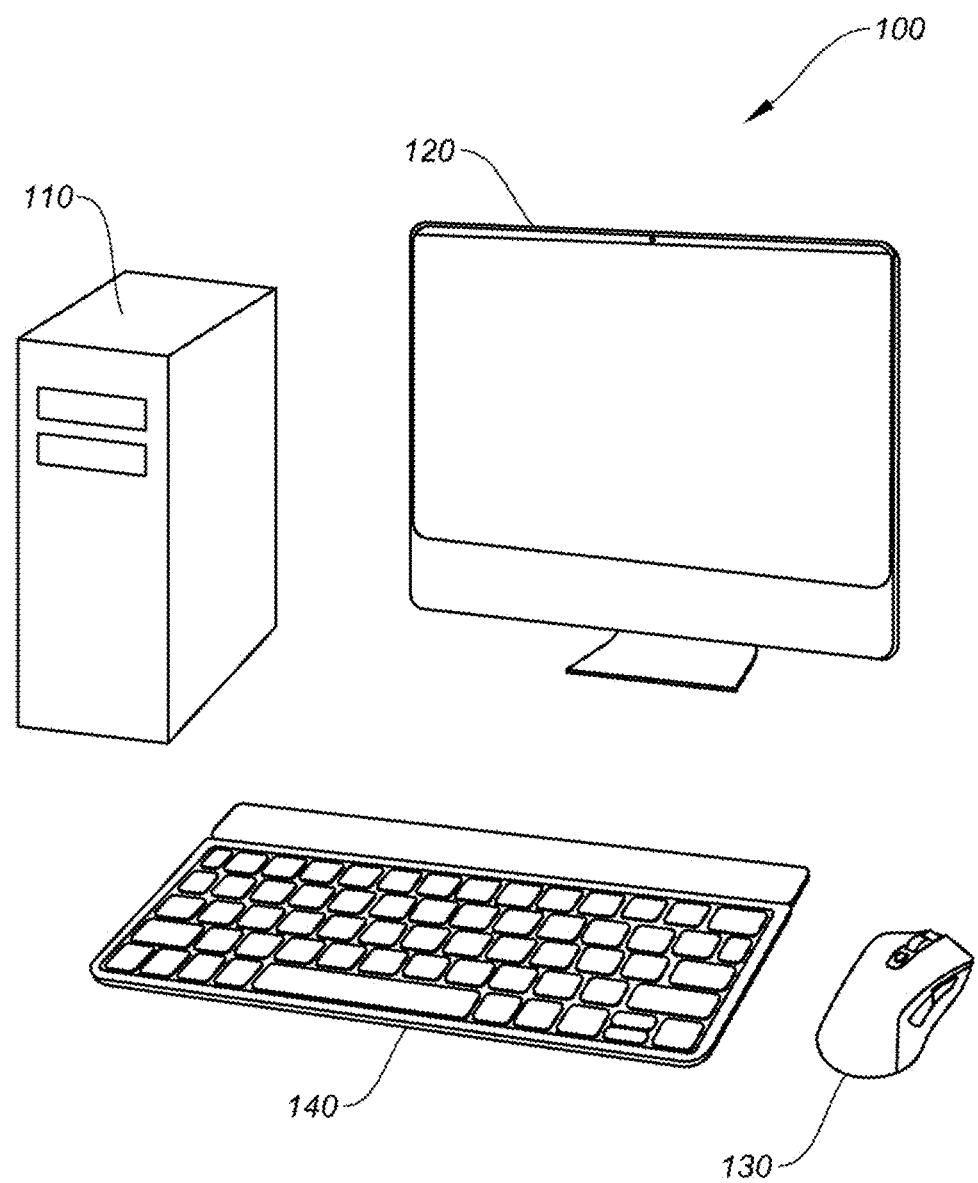
FIG. 1 shows a simplified diagram of a computer system, according to certain embodiments.

Embodiments of this invention are generally directed to input devices. More specifically, systems and devices relate to dual-mode optical input device.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Certain embodiments of the invention include a dual-mode optical input device (e.g., computer mouse) that can operate in different performance settings including either a first mode of operation (e.g., gaming mode) configured for high performance operation (e.g., FPS gaming), or a second mode of operation (e.g., "productivity" or "office" mode) configured for moderate performance (e.g., office use) with comparatively low power consumption and long battery life. These performance settings can be realized in a number of ways, including the modifications that follow. Thus, certain embodiments of the invention can achieve two specialized and operatively diverse modes of operation in a single device that conventionally has only be achieved in two separate and individually specialized input devices.

In some embodiments, a housing includes one or more processors to control an image sensor disposed in the housing to track a movement of the input device with respect to an underlying surface. The image sensor can include a pixel array (e.g., 32×32 pixels) and the image sensor may operate in two modes of operation including a first mode of operation where the image sensor utilizes a first plurality of pixels (e.g., 28×28 pixels) in the pixel array when tracking the movement of the input device, or a second mode of operation where the image sensor utilizes a second plurality of pixels (e.g., 28×14 pixels) in the pixel array when tracking the movement of the input device with respect to the underlying surface. Certain embodiments utilizing aspects of modifying a number of used pixels between modes of operation using a single image sensor are discussed below at least with reference to FIGS. 4A-4B and FIG. 7.

In some embodiments, tracking the movement of the input device is characterized by a frame rate, which can dictate the rate at which successive images are taken of the underlying surface to detect movement. High frame rates typically provide for high accuracy and improved tracking conditions (e.g., for fast-moving and high performance gaming applications), usually at the cost of increased power consumption. Lower frame rates typically have satisfactory accuracy with moderate tracking conditions (e.g., sufficient of typical office applications such as word processors, spreadsheets, web browsers, etc.), but with improved power consumption and greater battery life. In some implementations, the frame rate can operate over a first range of frequencies (e.g., 1 KHz-20 KHz under normal operating conditions) when the input device is placed in the first most of operation, and the frame rate can operate over a second range of frequencies (e.g., 100 Hz-5 KHz) when in the input device is placed in the second mode of operation. Some exemplary embodiments may use different ranges, such as 1 KHz-17 kHz for the first range of frequencies, and 250 Hz-5 kHz for the second range of frequencies, although other ranges are possible. Modifying an image sensor frame rate when switching between modes of operation are further discussed below at least with reference to FIGS. 5A-5B and FIG. 7.

In certain embodiments, a number of memory slots may be used to correlate movement of the input device with respect to the underlying surface. Generally, the more memory slots used, the more reference points the system has to correlate and validate a detected movement, which can improve tracking accuracy and performance, as further discussed below. In some implementations, a first plurality of memory slots (e.g., 4 memory slots) can be used to correlate movement of the input device when the input device is placed in the first mode of operation, and a second plurality of memory slots (e.g., 2-3 memory slots) can be used to correlate movement of the input device when the input device is placed in the second mode of operation. Memory slots can also be referred to as "memory pages," "memory cells," "memory blocks," and the like, as would be understood by one of ordinary skill in the art. Certain aspects of modifying a number of used memory slots between modes of operation using a single image sensor are further discussed below at least with reference to FIGS. 6A-FIG. 7.

In some embodiments, the input device (e.g., computer mouse) can change a mode of communication with a host computing device depending on the mode of operation. The first mode of operation may be configured for high performance operation and a fast communication protocol may be used. The second mode of operation may be configured for moderate performance with long battery life and a lower power communication protocol may be used. In some cases, the first mode of operation may employ a communication protocol that has a report rate of less than 5 ms per report (e.g., Logitech® proprietary communications protocol), and the second mode of operation may employ a communication protocol that has a report rate of 5 ms or greater (e.g., Bluetooth® Low Energy or "BLE"). Other communication protocols may be used, as would be understood by one of ordinary skill in the art. Certain embodiments utilizing aspects of modifying a type of communication protocol between modes of operation are further discussed below at least with reference to FIG. 7.

FIG. 1 shows a simplified diagram of a computer system 100, according to certain embodiments. Computer system 100 can include computer 110, monitor 120, input device 130, and keyboard 140. In some embodiments, input device 130 can be a computer mouse, a remote control device, a game controller (e.g., game pad, joystick, etc.), a smart phone, or other suitable device that can be used to convert analog inputs into digital signals for computer processing. For computer system 100, input device 130 can be configured to control various aspects of computer 110 and monitor 120.

Computer 110 can be any suitable computing device including, but not limited to, a desktop computer, a laptop computer, a tablet or "phablet" computer, a smart phone, a PDA, a wearable devices (e.g., smart watches, smart glasses), VR/AR system, or the like. In some embodiments, input device 130 can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of a myriad of additional features that would be understood by one of ordinary skill in the art. Computer 110 may include a machine readable medium (not shown) that is configured to store computer code, such as mouse driver software, where the computer code is executable by a processor (see, e.g., processor 802 of FIG. 8) of computer 110 to control aspects of computer 110 via input device 130, keyboard 140, or the like. The various embodiments described herein generally refer to input device 130 as a computer mouse or similar input device, however it should be understood that input device 130 can be any suitable input/output (I/O) device (e.g., user interface device, control device, input unit, or the like) that may be adapted to utilize the novel embodiments described and/or contemplated herein.

Exemplary System for Operating Dual-Mode Input Device

Figure 2:
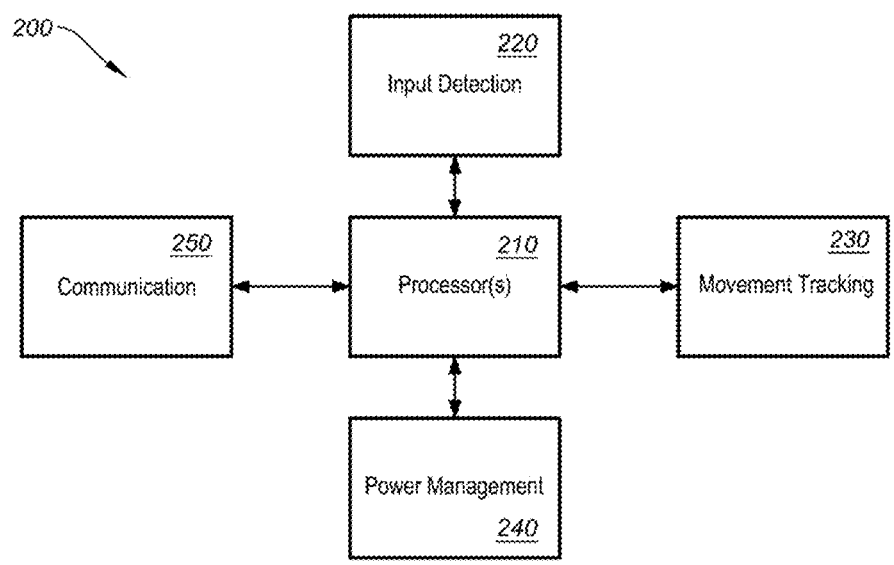
FIG. 2 shows a simplified block diagram of a system to operate input device, according to certain embodiments.

FIG. 2 shows a simplified block diagram of a system 200 to operate input device 130, according to certain embodiments. System 200 may include processor(s) 210, input detection block 220, movement tracking block 230, power management block 240, and communication block 250. Each of system blocks 220-250 can be in electrical communication with processor 210. System 200 may further include additional systems that are not shown or described to prevent obfuscation of the novel features described herein.

In certain embodiments, processor(s) 210 may include one or more microprocessors (µCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, and the like, may be configured in other system blocks of system 200. For example, communications block 250 may include a local processor to control communication with computer 110 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein.

Input detection block 220 can control the detection of button activation (e.g., main buttons, side buttons, a scroll wheel button, etc.), scroll wheel and/or trackball manipulation (e.g., rotation detection), sliders, switches, touch sensors (e.g., one and/or two-dimensional touch pads), and the like. In some embodiments, input detection block 220 can detect when a key plate (e.g., left mouse button) is depressed with a sufficient force (e.g., a threshold force) such that it contacts and activates a force sensor (e.g., an actuator). The force sensor may generate a corresponding control signal (e.g., human interface device (HID) signal) to control a computing device (e.g., computer 110) communicatively coupled to the input device (e.g., instantiating a "left click" on the computer). Alternatively, the functions of input detection block 220 can be subsumed by processor 210, or in combination therewith.

In some embodiments, input detection block 220 can detect a touch or touch gesture on one or more touch sensitive surfaces on input device 130. Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 130 may or may not utilize touch detection or touch sensing capabilities.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Movement tracking block 230 can be configured to track a movement of input device 130. Movement tracking block 230 can use optical sensors such as light-emitting diodes (LEDs) and an imaging array of photodiodes to detect a movement of input device 130 relative to an underlying surface. Input device 130 may optionally include movement tracking hardware that utilizes coherent (laser) light. In certain embodiments, an optical sensor is disposed on the bottom side of input device 130, as shown in FIG. 3B. Movement tracking block 230 can provide positional data (e.g., X-Y coordinate data) or lift detection data. For example, an optical sensor can detect when a user lifts input device 130 off of a work surface and can send that data to processor 210 for further processing. In some embodiments, processor 210, movement tracking block 230 (which may include an additional dedicated processor), or a combination thereof may perform some or all of the novel functions described herein including modifying a number of image sensor pixels used for different modes of operation (e.g., a first mode of operation and a second mode of operation), changing an image sensor frame rate for different modes of operation, and changing a number of memory slots used for different modes of operation, as further described below.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 130 has been lifted off of a surface and provide movement data that may include the velocity, physical orientation, and acceleration of input device 130. In some embodiments, gyroscope(s) can be used in lieu of or in conjunction with accelerometer(s) to determine movement or input device orientation.

Power management block 240 can be configured to manage power distribution, recharging, power efficiency, and the like, for input device 130. In some embodiments, power management block 240 can include a battery (not shown), a USB-based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between input device 130 and computer 110, or other devices and/or peripherals, according to certain embodiments. Communications block 250 can be configured to provide wireless connectivity (e.g., radio-frequency (RF), Bluetooth, BLE, infra-red (IR), ZigBee, Z-Wave, Logitech Unifying, or the like) to computer 110 or other wireless devices. System 200 may include a hardwired connection to computer 110 (e.g., USB, FireWire, etc.). For example, input device 130 can be configured to receive a Universal Serial Bus (USB) cable to enable bi-directional electronic communication with computer 110 or other external devices. Some embodiments may utilize different types of cables or connection protocol standards to establish hardwired communication with other entities. In some embodiments, processor 210, communication block 250, or a combination thereof may perform some of the novel functions described herein including switching between communication protocols when changing between a first and second mode of operation, as further described below at least with respect to FIG. 7.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 240 and/or movement tracking block 230 may be integrated with processor(s) 210 instead of functioning as a separate entity.

Example Embodiment of a Dual-Mode Input Device

Figure 3A:
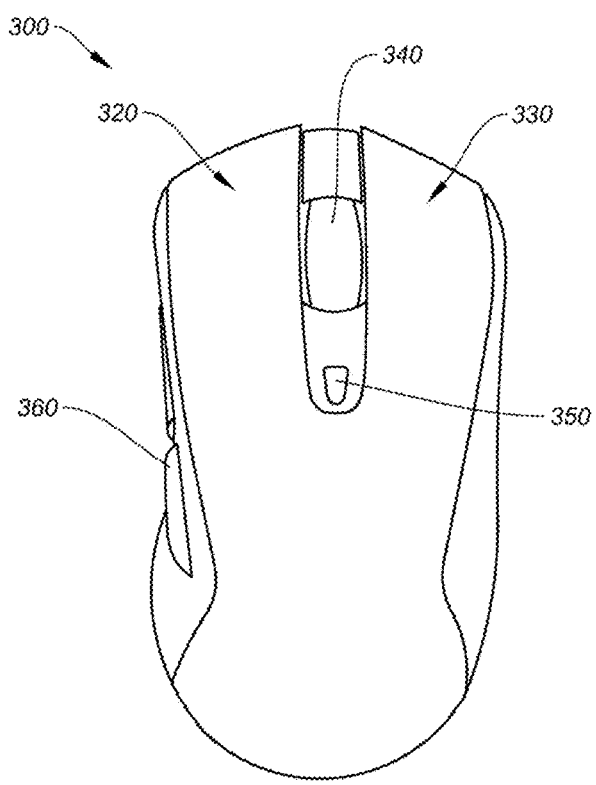
FIG. 3A shows aspects of an input device, according to certain embodiments.
Figure 3B:
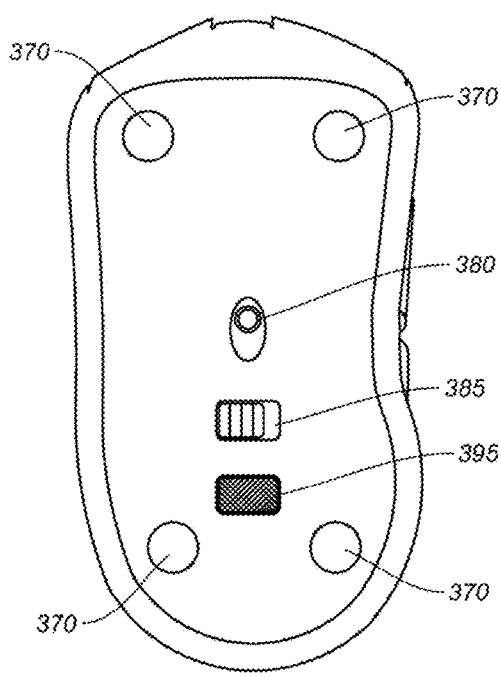
FIG. 3B shows aspects of a bottom portion of input device, according to certain embodiments.

FIG. 3A shows aspects of an input device 300, according to certain embodiments. Input device 300 can include housing 310, left button 320, right button 330, scroll wheel 340 and buttons 350, 360, as well as any other suitable input elements (e.g., additional buttons, side scroll wheels, touch sensors, etc.) or output elements (e.g., light emitting diodes (LEDs), displays, haptic feedback elements, speakers, etc.), and the like. In some cases, button 350 may be a mode selection button. For example, button 350 may be depressed to switch between a first mode of operation (e.g., gaming mode) and a second mode of operation (e.g., "office" mode). The first mode of operation may be a high performance mode tuned for detecting high speed movement (e.g., 100+ inches-per-second or "ips"), quick directional changes, and high acceleration conditions, which typically occurs in competitive gaming conditions (e.g., first person shooter or "FPS" gaming). The second mode of operation may be a moderate performance mode tuned to typical office use (e.g., 1-20 ips) with low power consumption. Alternatively or additionally, other modes of operation are possible with different performance characteristics, as would be understood by one of ordinary skill in the art. Various embodiments of the first and second modes of operation and their corresponding performance characteristics are further described below with respect to FIGS. 4A-7.

In some embodiments, buttons 350, 360 may be configured to switch communication between host computing devices. For instance, some embodiments may have multi-host connectivity such that input device 300 may communication with a first host computer (e.g., a PC laptop) and switch to a second host computer (e.g., a Mac computer) in response to a corresponding button press, as further described in patent application Ser. No. 14/884,381, which is incorporated by reference in its entirety for all purposes. Alternatively or additionally, switching between hosts may be achieved by, for example, moving a corresponding cursor to an edge of a display in a "flow" enabled system, as further described in patent application Ser. No. 15/226,770 which is incorporated by reference in its entirety for all purposes. Buttons 345, 360 or any other input devices can be configured in any suitable manner and may utilize any suitable function, which can be pre-set or user programmed (e.g., via corresponding driver software on a host computing device), as would be understood by one of ordinary skill in the art.

FIG. 3B shows aspects of a bottom portion of input device 300, according to certain embodiments. The bottom of input device 300 can include one or more feet 370, an image sensor 380, and a power switch 385. Additional input elements (e.g., buttons, sliders, etc.) may be included. In some cases, power switch 385 may be located elsewhere on the mouse or may not be included at all (e.g., input device 300 may power up/power down based on usage). Button 395 may be a mode selection switch (e.g., switch for selecting a first mode of operation or a second mode of operation), a multi-host computer selection button, or the like. In some embodiments, button 395 may be a communication protocol selection button. For example, pressing button 395 may switch between a proprietary high-frame rate communication protocol or a lower power lower frame rate communication protocol (e.g., Bluetooth® LE). One of ordinary skill in the art with the benefit of this disclosure would understand the many variations, modifications, and alternative embodiments thereof.

In preferred embodiments, image sensor 380 is located near the center of the bottom portion of input device 300, as shown. Image sensor 380 is a single sensor, but can operate in two or more modes of operation, according to certain embodiments. An image sensor can be a complementary metal-oxide semiconductor (CMOS) sensor that captures images of the underlying surface and sends each image to a processor (e.g., processor 210) for analysis. Other types of image sensors may be used, including charge-coupled devices (CCD), N-type metal-oxide-semiconductors (NMOS), hybrid devices (e.g., CCD/CMOS), or the like, as would be understood by one of ordinary skill in the art. The processor can detect patterns in the images and see how those patterns have moved since the previous image, and based on changes in the patterns over a sequence of images, the processor can determine how far and what direction the corresponding input device has moved, which can be sent to the host computer to control one or more functions (e.g., control a cursor on a display, control an audio volume in a music application, etc.). This process can occur many hundreds if not thousands of times per second to accurately detect movement of all types including a range of movement speeds and accelerations.

To illustrate the basic operational fundamentals of optical input devices (e.g., optical computer mice), consider two photographs of the same object that are slightly offset from one another. When placed on a light table, the photographs can appear transparent such that one can be accurately aligned over the other. The amount that the edges of a particular image (or on a smaller scale, a particular surface feature) are offset represents the amount that the optical mouse is displaced, which can be detected by an image sensor comprised of an array of pixels. Optical mice can capture hundreds and sometimes thousands of successive images or more per second (defined by a "frame rate" discussed below). Depending on how fast the input device is moving, each offset between successive images may be a fraction of a pixel or as many as several pixels. Optical input devices can mathematically process these images using cross-correlation to calculate how much each successive image is offset from the previous image, as would be understood by one of ordinary skill in the art. This basic understanding forms the basis of the many novel concepts described herein.

Switching Size of Active Pixel Array in Dual-Mode Input Device

Figure 4A:
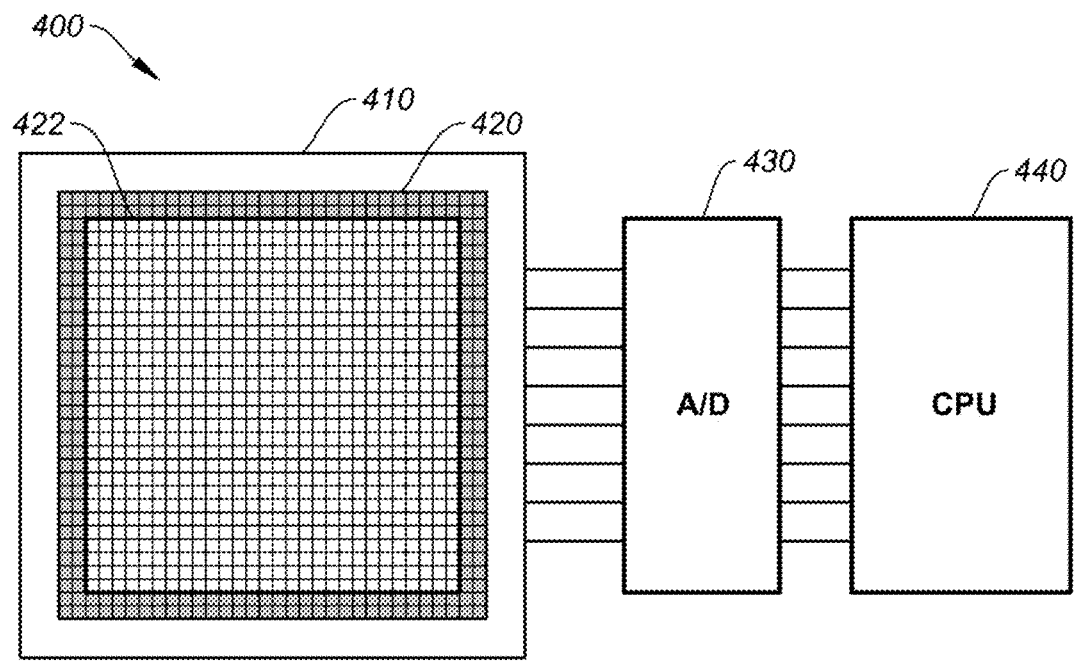
FIG. 4A shows an image sensor system configured in a "gaming" mode of operation, according to certain embodiments.
Figure 4B:
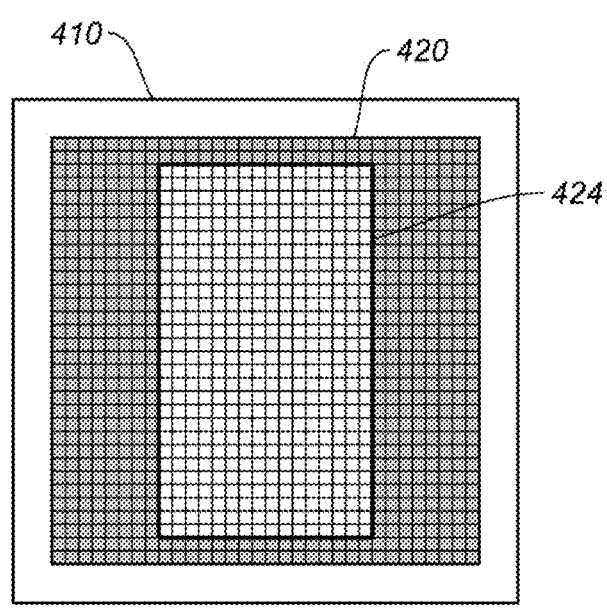
FIG. 4B shows image sensor system configured in an "office" mode of operation, according to certain embodiments.

FIG. 4A shows an image sensor system 400 configured in a "gaming" mode of operation, according to certain embodiments. FIG. 4B shows image sensor system 400 configured in an "office" mode of operation, according to certain embodiments. Image sensor system 400 can include an image sensor 410, analog-to-digital ("A/D") converter 430, and processor 440. Image sensor 410 can be similar to image sensor 380 of FIG. 3B. Processor 440 may be a dedicated processor for image processing, processor 210, or may function as a combination thereof. In some instances, image sensor system 400 may be implemented by system 200 and subsumed in part, or in whole, by movement tracking block 230, processor 210, or a combination thereof. A/D 430 can include a number of system blocks including multiplexors and comparators to address (multiplex/demultiplex) and convert each analog input (e.g., successive images taken by image sensor 410) into a digital signal for processing by processor 210, as would be understood by one of ordinary skill in the art with the benefit of this disclosure.

Image sensor 410 may be comprised on a plurality of individual pixels of any suitable size. Referring to FIG. 4A, a 32×32 pixel matrix 420 is shown. Generally, the more pixels used in the pixel matrix, the more accurate and higher the speed of detected movement can be, at the cost of greater processing resources (e.g., requiring processor 440 to process greater amounts of data) in addition to greater power consumption. When input device 300 is placed in a high performance "gaming" mode of operation (e.g., the first mode of operation), a first number of pixels 422 may be used (e.g., 28×28 pixels—see FIG. 4A). When input device 300 is placed in "office" mode (e.g., the second mode of operation), a second number of pixels 424 may be used (e.g., 28×14 pixels—see FIG. 4B). The first number of pixels used in "gaming mode" is typically greater than the number of pixels used in "office mode," however any suitable number of pixels can be used for either "gaming" or "office" modes, and any size pixel array can be used (e.g., 20×20 pixels, 30×30 pixels, etc.). In some embodiments, correlation may only be performed on a single axis (e.g., Y-axis) instead of both axes (e.g., X and Y axes), which may reduce both computation time and power consumption, sometimes at the cost of certain performance characteristics (e.g., reduced accuracy with high speed/acceleration conditions). Thus, single-axis measurements can be well-suited for "office mode" settings where reduced power consumption over high-end tracking performance may be preferred. In some cases, some rows and columns of pixels to may be omitted in one or both modes of operation to simplify tracking calculations and improve performance (e.g., see FIGS. 4A-4B). For instance, edge pixels may not have similar pixel neighbor conditions as center pixels, which can require additional computational resources to reconcile those differences. Thus, in some embodiments, some or all of the data from edge pixels can be discarded from the correlation computation. One of ordinary skill in the art with the benefit of this disclosure would understand the many variations, modifications, and alternative embodiments thereof.

Switching Between Frame Rate Algorithms in Dual-Mode Input Device

As indicated above, a "frame rate" defines a frequency at which the image sensor takes images of an underlying surface. Generally, quick movements (e.g., 20 ips or more) with the input device may preferably be detected using a fast frame rate (e.g., 5 kHz or more) to fully capture the movement with accuracy (e.g., how close the measurement is to the actual movement speed and/or acceleration) and precision (e.g., how repeatable an identical measurement is). Likewise, slow movements (e.g., 1-5 ips) with the input device may be adequately detected with a slower frame rate (e.g., 1 kHz), while still achieving accuracy and precision. Higher frame rates tend to cause the input device (e.g., system 200) to consume more power than do lower frame rates. In some cases, surface conditions can also affect power consumption. For example, surfaces with a high density of surface features may be easier to track movement on as compared to surfaces with few surface features because there are more points of reference for detecting movement. Thus, an input device operating on a surface with a low density of surface features may use more light intensity and/or a higher frame rate for a particular movement and/or acceleration than the input device operating on a surface with a high density of surface features under the same movement and acceleration conditions.

The various examples presented here describe the operation of image sensor 380 according to a frame rate that may span over a range of frequencies, which can be referred to as a frame rate algorithm. In some embodiments, the frame rate is adjusted to dynamically adapt to a current movement speed and/or acceleration. For example, as movement speed and/or acceleration increase, the frame rate may be dynamically adjusted to increase to maintain a particular level of precision and accuracy (e.g., within <1% accuracy, or other suitable tolerance). In other words, certain embodiments can be configured to target a given displacement distance and adjust the frame rate to get a number of images needed to achieve the same displacement between subsequent images. The dynamic adjustment can be continuous (e.g., analog change in frequency over a range of frequencies) or stepwise (e.g., a quantized number of steps over a range of frequencies). For example, the embodiments shown in FIGS. 5A and 5B utilize a continuous dynamic adjustment scheme. One of ordinary skill in the art would understand the many variations, modifications, and alternative embodiments thereof.

Figure 5A:
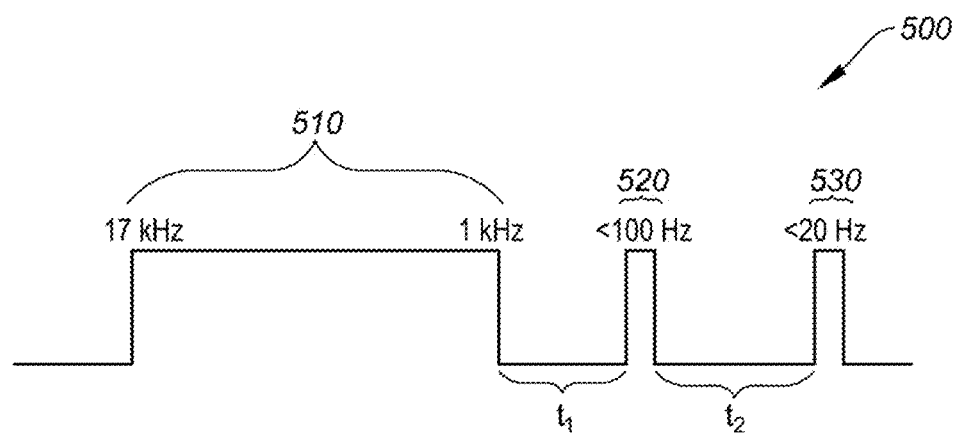
FIG. 5A shows a simplified frame rate algorithm for an input device configured in a gaming mode of operation, according to certain embodiments.

FIG. 5A shows a simplified frame rate algorithm 500 for an input device in a gaming mode (e.g., first mode) of operation, according to certain embodiments. Frame rate algorithm 500 can be a "high performance" algorithm that may be adapted to accurately track high movement speeds and accelerations of input device 300. Frame rate algorithm 500 can include operative band 510, first shutdown frame rate 520 and second shutdown frame rate 530. Operative band 510 may represent a band of frequencies that the frame rate operates under normal operating conditions when in the first mode of operation. In some embodiments, operative band 510 may span from 1 kHz to 20 kHz. Referring to FIG. 5A, operative band 510 spans from 1 kHz to 17 kHz. Thus, processor 210 and/or movement tracking block 230 may dynamically adjust image sensor 380 to operate near the 17 kHz maximum frame rate in response to detecting movements of input device 300 that exceed 100 ips (or other suitable threshold). Note that, in some embodiments, image sensor (380) can detect >40 g acceleration at a 1 kHz frame rate. Conversely, image sensor 380 may by dynamically adjusted to operate near 1 kHz in response to detecting movements of input device 300 that fall below 1 ips (or other suitable threshold). Other ranges are possible, as would be understood by one of ordinary skill in the art.

In some embodiments, a reduced frame rate may be implemented during periods of non-use. For instance, if no movement is detected for a first period of time (e.g., time "$t_1$"), then it may be determined that the user is unlikely to be currently interfacing with the mouse and a slower, lower power shutdown frame rate 520 can be employed (e.g., <100 Hz, 50 Hz, etc.). In some cases, after a second period of time (e.g., time "$t_1+t_2$"), a further reduced shutdown frame rate 530 with a corresponding lower power consumption may be employed (e.g., <20 Hz, 10 Hz, etc.). When movement is detected, the frame rate can return from shutdown frame rate 520 or 530 back to operative band 510. More or fewer "shutdown" frame rates can be used at any suitable frequency and time threshold. One of ordinary skill in the art would understand the many variations, modifications, and alternative embodiments thereof.

Figure 5B:
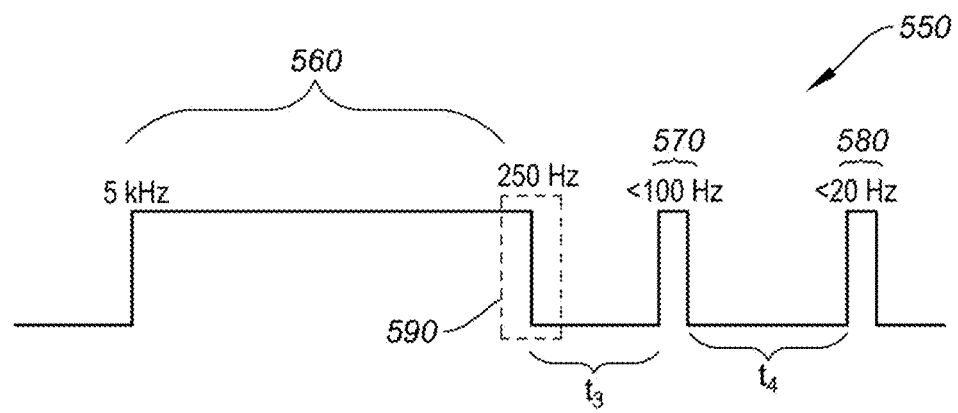
FIG. 5B shows a simplified frame rate algorithm for an input device configured in an office mode of operation, according to certain embodiments.

FIG. 5B shows a simplified frame rate algorithm 550 for an input device in an office mode (e.g., second mode) of operation, according to certain embodiments. Frame rate algorithm 550 can be a normal use algorithm that may be adapted to accurately track typical movement speeds and accelerations of input device 300 under normal office conditions, as further described above. Frame rate algorithm 550 can include operative band 560, first shutdown frame rate 570 and second shutdown frame rate 580. Operative band 560 may represent a band of frequencies that the frame rate operates under normal operating conditions when in the second mode of operation. In some embodiments, operative band 560 may span from 100 Hz to 10 kHz. Referring to FIG. 5B, operative band 560 spans from 250 Hz to 5 kHz. Thus, processor 210 and/or movement tracking block 230 may dynamically adjust image sensor 380 to operate near the 5 kHz maximum frame rate in response to detecting movements of input device 300 that exceed 20 ips (or other suitable threshold). Note that, in some embodiments, 2 g or better movement tracking is possible even at 50 Hz frame rate (e.g., in Office Mode). Conversely, image sensor 380 may by dynamically adjusted to operate near 250 Hz in response to detecting movements of input device 300 that fall below 1 ips (or other suitable threshold). Other ranges are possible, as would be understood by one of ordinary skill in the art.

In some embodiments, a reduced frame rate may be implemented during periods of non-use. For instance, if no movement is detected for a first period of time (e.g., time "$t_3$"), then it may be determined that the user is unlikely to be currently interfacing with the mouse and a slower, lower power shutdown frame rate 570 can be employed (e.g., <100 Hz, 50 Hz, etc.). In some cases, after a second period of time (e.g., time "$t_3+t_4$"), a further reduced shutdown frame rate 580 with a corresponding lower power consumption may be employed (e.g., <20 Hz, 10 Hz, etc.). When movement is detected, the frame rate can return from shutdown frame rate 520 or 530 back to operative band 510. In some situations, certain undesirable operating conditions may occur when immediately moving from a low frame rate (e.g., 100 Hz) of the frame rate algorithm to a high frame rate (e.g., 5 kHz), which may manifest in pixel reading errors, system lockup, drop outs, loss of matching, or other error condition. Thus, some embodiments may pause at an intermediary frame rate 590 (e.g., 250 Hz for 20 ms) as a first target frame rate and then continue on to a final target frame rate (e.g., 5 kHz) when the detected movement and/or acceleration exceeds a certain speed and/or acceleration (e.g., 20 ips) to avoid the above referenced undesirable operating conditions. More or fewer "shutdown" frame rates can be used at any suitable frequency and time threshold. Further, some embodiments may not use an intermediary frame rate, or may use the intermediary frame rate in the first most of operation (see, e.g., FIG. 5A). One of ordinary skill in the art would understand the many variations, modifications, and alternative embodiments thereof.

Switching Between Memory Slot Allocations in Dual-Mode Input Device

Memory slots can be used to store an images taken by the pixel array. Input device 300 can use a number of memory slots to save successive image sensor images that are used to detect movement of input device 300 along an underlying surface. At minimum, two memory slots are needed to correlate movement. For instance, a first page (saved to a first memory slot) may include a surface feature or particle and a second page (saved to a second memory slot) may include the same surface feature or particle, but located a distance from the position shown in the first page. Note that a "page" can be referred to as an "image." The detected difference of location is used to interpolate a movement of the input device with respect to the underlying surface, as would be understood by one of ordinary skill in the art. "Memory slots" may be interchangeably referred to as "memory blocks," "memory pages," "memory cells," and the like. The memory slots may be part of and/or controlled by processor 210, movement tracking block 230, or a combination thereof. In some cases, memory slots may be stored on external memory (e.g., external to processor 210 and/or movement tracking block 230) and controlled by one or more resources of system 200. In certain embodiments, the memory slots are stored on the image sensor silicon and may be controlled by image sensor 380, processor 210, or a combination thereof. In some cases, the image sensor can be subsumed, wholly or in part, by movement tracking block 230. One of ordinary skill in the art would understand the many variations, modifications, and alternative embodiments thereof.

Additional memory slots may be used to better correlate movement for improved accuracy. For example, some images may include noise or other interference. In such cases, having an additional memory slot to capture an earlier image may be useful as it can provide another set of data points to correlate a detected movement. Generally, more memory slots can provide better correlation and thus improved accuracy over both the first and second modes of operation. However, having additional memory slots (e.g., 3 or more) typically requires additional computational resources as more data (additional memory pages) has to be analyzed and correlated with the other memory pages. Higher performance settings (e.g., the first mode of operation) can typically benefit more from additional memory pages as they can further support the accurate detection of fast movements and/or accelerations of the input device. In some exemplary embodiments, input device 300 can include four or more memory slots when placed in the first mode of operation. However, more or fewer memory slots may be used, as would be understood by one of ordinary skill in the art.

Figures 6A, 6B, 6C:
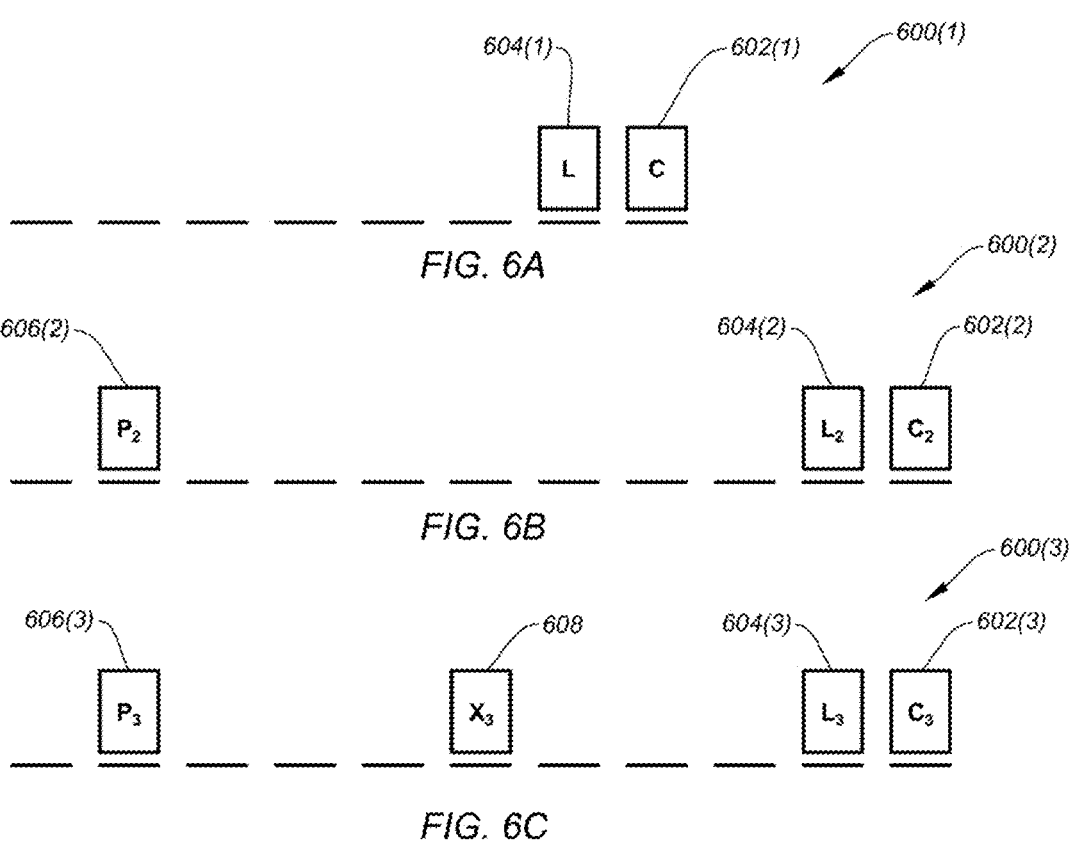
FIG. 6A shows a memory array of memory slots used for tracking movement of an optical input device, according to certain embodiments.
FIG. 6B shows a number of memory slots used for tracking the movement of an optical input device, according to certain embodiments.
FIG. 6C shows a number of memory slots used for tracking the movement of an optical input device, according to certain embodiments.

FIG. 6A shows a memory array 600(1) of memory slots used for tracking movement of an input device, according to certain embodiments. Memory array 600(1) includes a first memory slot 602(1) labeled "C" that corresponds to a current image taken by an image sensor and a second memory slot 604(1) labeled "L" that corresponds to the latest previous image. As indicated above, at least two memory slots are needed for correlation and movement tracking. Such embodiments may be susceptible to drifting or erratic tracking as no additional memory slots are available for validating correlation.

FIG. 6B shows a memory array 600(2) of memory slots used for tracking the movement of an optical input device in a second mode of operation, according to certain embodiments. Memory array 600(2) includes a first memory slot 602(2) labeled "$C_2$" that corresponds to a current image taken by an image sensor, a second memory slot 604(2) labeled "$L_2$" that corresponds to the latest previous image, and a third memory slot 606(2) labeled "$P_2$" that corresponds to an earlier previous image. Memory slot 606(2) is shown as the tenth successive image prior to a current image, however memory slot 606(2) may be positioned in any suitable location (e.g., $7^{th}$ position, $15^{th}$ position, etc.). In some embodiments, the location of memory slot 606(2) can be dynamically adjusted. Depending on the detected speed of movement, memory slot 606(2) may be dynamically moved to different positions. For example, increasing or fast speeds (e.g., 5-10 ips) may cause memory slot 606(2) to move to a closer position to memory slot 602(2) (e.g., the $5^{th}$ position), while decreasing or slow speeds (e.g., 0-1 ips) may cause memory slot 606(2) to move to a farther position from 602(2) (e.g., the 15 position). The examples provided here are not intended to be limiting and one of ordinary skill in the art with the benefit of this disclosure would understand how to appropriately configure the position of memory slot 606(2) relative to memory slots 602(2) and 604(2) (e.g., via a memory slot control algorithm adapted, at least in part, by the movement speed, frame rate, or the like). Alternatively, one or more of the memory slots may be statically positioned (e.g., "C" and "L" memory slots are typically set, however some embodiments may further set the P memory slot). In some cases, the three memory page scheme of FIG. 6B can be used when input device 300 is placed in the second mode of operation ("office mode").

FIG. 6C shows a memory array 600(3) of memory slots used for tracking the movement of an optical input device in a first mode of operation, according to certain embodiments. Memory array 600(3) includes a first memory slot 602(3) labeled "$C_3$" that corresponds to a current image taken by an image sensor, a second memory slot 604(3) labeled "$L_3$" that corresponds to the latest previous image, a third memory slot 606(3) labeled "$P_3$" that corresponds to an earlier previous image, and a fourth memory slot 608 labeled "$X_3$" that corresponds to an intermediate image between $P_3$ and $L_3/C_3$. Memory slot 606(3) is shown as the tenth successive image prior to a current image, however memory slot 606(3) may be positioned in any suitable location (e.g., $7^{th}$ position, $15^{th}$ position, etc.). Memory slot 608 is shown as the sixth successive image prior to a current image, however memory slot 608 may be positioned in any suitable location (e.g., $3^{rd}$ position, $8^{th}$ position, etc.). In some embodiments, the location of memory slots 606(3) and/or 608 can be dynamically adjusted, as described above. Alternatively, one or more of the memory slots may be statically positioned (e.g., "C" and "L" memory slots are typically set, however some embodiments may further set the P and X memory slots). In some cases, the four memory page scheme of FIG. 6C can be used when input device 300 is placed in the first mode of operation ("gaming mode"). Generally, the use of additional memory slots can require additional data to process and greater power consumption. Thus, when switching from the first mode of operation (e.g., with four memory slots) to the second mode of operation (e.g., with three memory slots), less power and processing resources are required. In some embodiments, the same number of memory slots may be associated with the first and second modes of operation for input device 300, however input device 300 may not read or write to memory slot X when placed in the second mode of operation to effectively only manage three rather than four memory slots. One of ordinary skill in the art would understand the many variations, modifications, and alternative embodiments thereof.

Figure 7:
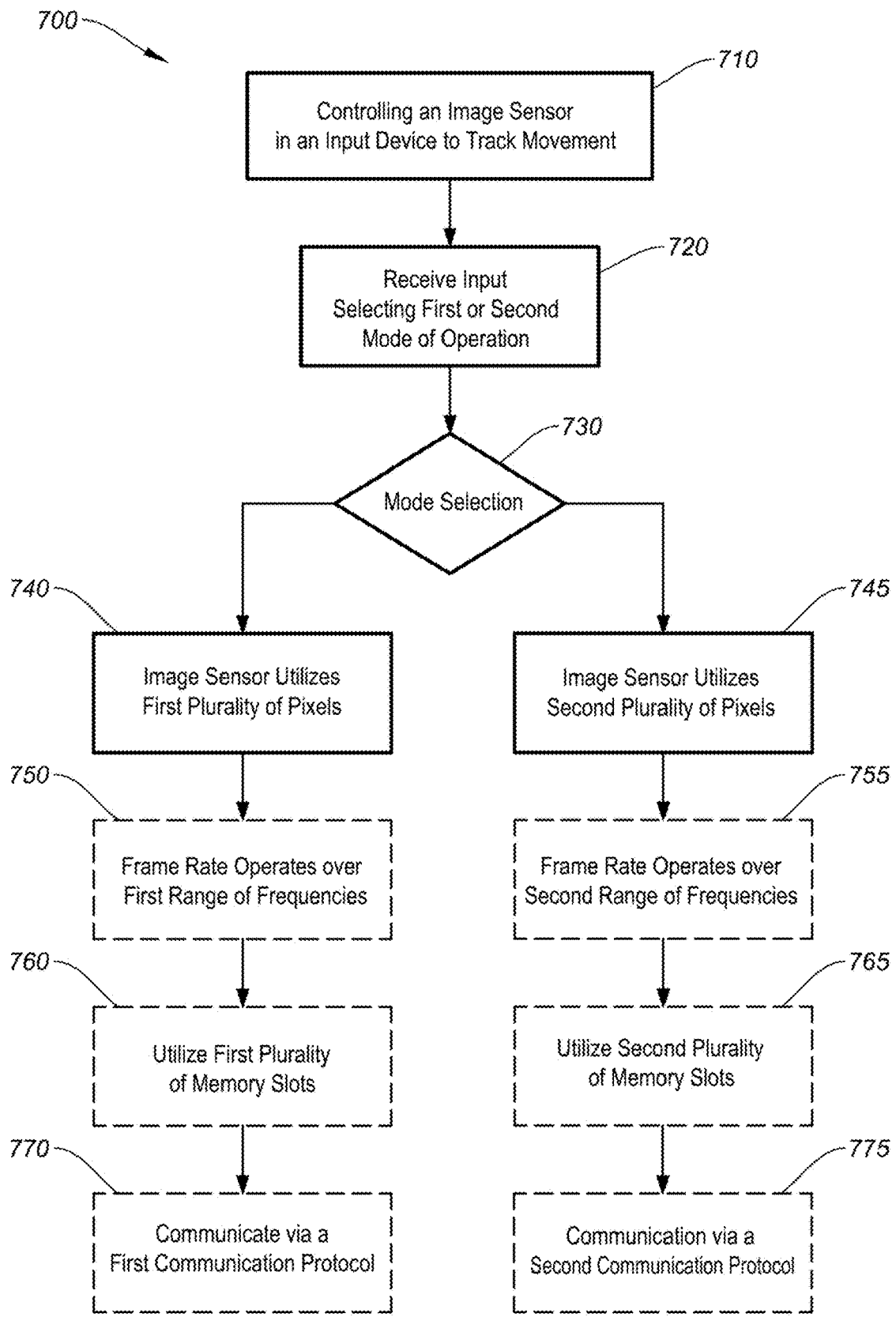
FIG. 7 is a simplified flow chart showing aspects of a method for operating a dual-mode optical input device, according to certain embodiments.

FIG. 7 is a simplified flow chart showing aspects of a method 700 for operating a dual mode optical input device, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by processor 210 of system 200, by resources in movement tracking block 230, or a combination thereof, as shown and described above with respect to FIG. 2.

At step 710, method 700 can include controlling, by one or more processors, an image sensor (380) disposed in the input device (300) to track a movement of the input device with respect to an underlying surface, according to certain embodiments. The image sensor may include a pixel array (410) having any suitable number of pixels and array dimensions. In some embodiments, the pixel array can be a 32×32 pixel matrix although larger or smaller arrays are possible. A single image sensor is typically used and is preferably located in a center position on the bottom of the input device, although some embodiments may employ offset (non-centered) image sensors. In addition to controlling the image processor to track a movement of the input device with respect to an underlying surface, the one or more processors can further cause the image sensor to power up and power down; dynamically control the image frame of the image sensor, e.g., changing the frame rate in a continuous and/or stepwise fashion based on detected movement, as further described above with respect to FIGS. 5A-5B; and set a mode of operation of the image sensor based on a user input (e.g., button 350), as further described below.

At step 720, method 700 can include receiving an input signal to place the input device in one of a first mode of operation or a second mode of operation, according to certain embodiments. In some cases, the first mode of operation can be a high-performance "gaming" mode of operation optimized for fast motion and acceleration tracking, and the second mode of operation can be moderate performance "office" mode of operation optimized for low-power and long battery life. Additional modes of operation are possible with each mode configurable with any suitable operational criteria including, but not limited to, pixel-array usage, frame rate settings, memory page settings, communication settings, and the like, as further described above at least with respect to FIGS. 4A-6C. An input signal can be referred to as an "input," a "control signal," or the like.

The input signal may be a signal indicative of a button press (e.g., button 350), a selection of a first or second mode via software operating on host computer 110 (e.g., computer mouse driver software), or an application-dependent auto mode-selection. For example, an active spreadsheet application may provide a signal causing input device 300 to switch to an "office" mode of operation, while a high-performance "first-person shooter" or FPS may provide a signal causing input device 300 to switch to a "gaming" mode of operation. In some embodiments, automatic selection can be activity dependent. For example, machine learning/artificial intelligence can be used to determine how a user is interfacing with the input device (e.g., slow or low-g movements, or fast and relatively high-g movements) using alternative detection means including video cameras or the like, and the appropriate mode (e.g., "office" or "gaming" mode) can be subsequently auto-selected based on the determination. When changed, some implementations may emit an audible cue (e.g., a beep or click) indicating that the input device has changed modes of operation. One of ordinary skill in the art would understand the many variations, modifications, and alternative embodiments thereof.

At step 730, method 700 can include determining which mode of operation has been selected based on the input signal, according to certain embodiments. At step 740, method 700 can include causing the image sensor to utilize a first plurality of pixels in the pixel array when tracking the movement of the input device with respect to the underlying surface when the input device is placed in the first mode of operation. In exemplary embodiments, the first mode of operation, or "gaming mode," can be configured for high performance (e.g., high speed and accuracy) to accommodate fast movements and accelerations of the input device that may often exceed 100 inches-per-second (ips). For example, in FPS games, users frequently perform very quick and precise movements over relatively large distances (e.g., 4+ inches) that require high tracking accuracy and consistency. One way to increase performance is to increase the number of pixels used in a pixel array. An increased amount of available pixel data can improve correlation when comparing images (e.g., comparing a present image to one or more previous images to detect movement), resulting in more accurate detection and better performance, but typically at the cost of greater computational resources. For example, using more pixels may require system 200 to address move pixel rows and/or columns, perform more calculations as more pixels are processed (e.g., run through comparators, A/D converted, etc.), and may take more time, which could prompt an increase in frame rate to accommodate the additional computations, as further discussed below. Certain embodiments may utilize some or all available pixels in a pixel array when set to "gaming mode," as shown and described above with respect to FIG. 4A.

At step 745, method 700 can include causing the image sensor to utilize a second plurality of pixels in the pixel array when tracking the movement of the input device with respect to the underlying surface, when the input device is placed in the second mode of operation. In exemplary embodiments, the second mode of operation, or "office mode," can be configured for low power consumption (e.g., long battery life) and moderate performance characteristics (e.g., moderate resolution and accuracy) to accommodate typical movements and accelerations of the input device that would normally be expected in everyday office use (e.g., internet browsing, word processing, controlling media, photo editing, etc.), which typically does not exceed 20 ips. For example, in word processors and spreadsheets, users frequently make small movements (e.g., under 1-2 inches) at moderate speed (e.g., under 5 ips) to perform typical operations on the corresponding software. One way to reduce battery consumption is to decrease the number of pixels used in a pixel array. A decreased amount of available pixel data can still provide excellent tracking and correlation between images, but at moderate performance levels. In other words, running "office mode" on office-related software can provide an excellent user experience as corresponding movements in the software would still be perceived as accurate tracking as these movements typically do not exceed 5 ips. Thus, "office mode" can provide good correlation when comparing smaller images (i.e., smaller number of scanned pixels) at slower movement speeds and acceleration using fewer computational resources and at a reduced power consumption for improved battery life. To further illustrate, using fewer pixels may allow system 200 to address fewer pixel rows and/or columns, perform fewer calculations as fewer pixels are processed (e.g., run through comparators, A/D converted, etc.), and may take less time, which could prompt a decrease in frame rate to accommodate the fewer computations. Certain embodiments may utilize a smaller subset of pixels (e.g., fewer pixels) in the "office mode" (second mode of operation), as compared to the "gaming mode" (first mode of operation), as shown and described above with respect to FIG. 4B.

At step 750 of method 700, tracking the movement of the input device can include operating the image sensor according to a frame rate, according to certain embodiments. As indicated above, the frame rate is the rate at which images of the underlying surface are taken. In some cases, the frame rate can be dynamically changed over a continuous range of frequencies (e.g., smooth analog control rather than step-wise quantized adjustments) depending on the mode of operation (e.g., first or second mode of operation) and the movement of the mouse (e.g., quicker movement may increase the corresponding frame rate, while slower movements may decrease the corresponding frame rate). Alternatively or additionally, the frame rate can be dynamically changed in a step-wise fashion (e.g., 1 KHz steps, 500 Hz steps, etc.).

Referring back to step 750, method 700 can further include operating the frame rate (e.g., "frame rate algorithm") over a first range of frequencies when in the first mode of operation ("gaming mode"), according to certain embodiments. A typical range of frequencies for the frame rate when the input device is configured in the first mode of operation may be between 1 KHz and 20 KHz. Other ranges are possible including higher or lower frame rate frequencies, larger or smaller ranges, or non-continuous ranges (e.g., multiple bands of frequencies). Some exemplary embodiments may utilize a dynamic, continuous frame rate adjustment setting with a frame rate range between 1 KHz and 17 KHz. Frame rate settings in these ranges are typically fast enough to accurately detect any fast movements or changes in acceleration for the input device with high precision well beyond human capabilities (e.g., a user's fastest possible movement or change in acceleration can be accurately detected, for instance, with a 1 KHz-17 KHz frame rate range of operation). Some embodiments may use other frame rate settings to accommodate various periods of non-use. For example, the frame rate in the first mode of operation may drop below 1 KHz (e.g., 50 Hz) if no movement is detected for over 60 s. In some cases, additional frame rate settings in the overall corresponding frame rate algorithm may drop even further for even longer periods of non-use (e.g., 5 min), which may result in reduced power consumption.

At step 755, method 700 can further include operating the frame rate over a second range of frequencies when input device 300 is placed in the second mode of operation ("office mode"), according to certain embodiments. A typical range of frequencies for the frame rate when the input device is configured in the second mode of operation may be between 100 Hz and 10 KHz. Other ranges are possible including higher or lower frame rate frequencies, larger or smaller ranges, or non-continuous ranges (e.g., multiple bands of frequencies). Some exemplary embodiments may utilize a dynamic, continuous frame rate adjustment setting with a frame rate range between 250 Hz and 5 KHz. Frame rate settings in these ranges are typically fast enough to accurately detect any office-type input device inputs (e.g., user movements) with high precision and consistency (e.g., typical input device movements while using word processing software). Some embodiments may use other frame rate settings to accommodate various periods of non-use. For example, the frame rate in the second mode of operation may drop to 50 Hz if no movement is detected for over 60 s. In some cases, additional frame rate settings in the overall corresponding frame rate algorithm may drop further for even longer periods of non-use (e.g., 5 min), which may result in further reduced power consumption. Any suitable frequency or time period may be used, as would be understood by one of ordinary skill in the art, however typical embodiments usually have the first range of frequencies from the first mode of operation different from the second range of frequencies from the second mode of operation.

At step 760, method 700 can include utilizing a first plurality of memory slots to correlate movement of the input device with respect to the underlying surface when in the first mode of operation, according to certain embodiments. As described above, input device 300 can use a number of memory slots to save successive image sensor images that are used to detect movement of input device 300 along an underlying surface. At minimum, two memory slots are needed to correlate movement. For instance, a first image (saved to a first memory slot) may include a surface feature or particle and a second image (saved to a second memory slot) may include the same surface feature or particle, but located a distance from the position shown in the first image. The detected difference of location is used to interpolate a movement of the input device with respect to the underlying surface, as would be understood by one of ordinary skill in the art. "Memory slots" may be interchangeably referred to as "memory blocks," "memory pages," "memory cells," and the like.

Additional memory slots may be used to better correlate movement for improved accuracy. For example, some images may include noise or other interference. In such cases, having an additional memory slot to capture an earlier image may be useful as it can provide another set of data points to correlate a detected movement. Generally, more memory slots can provide better correlation and thus improved accuracy over both the first and second modes of operation. However, having additional memory slots (e.g., 3 or more) typically requires additional computational resources as more data (additional memory pages) has to be analyzed and correlated with the other memory pages. Higher performance settings (e.g., the first mode of operation) can typically benefit more from additional memory pages as they can further support the accurate detection of fast movements and/or accelerations of the input device. In some exemplary embodiments, input device 300 can include four or more memory slots when placed in the first mode of operation. However, more or fewer memory slots may be used, as would be understood by one of ordinary skill in the art.

At step 765, method 700 can include utilizing a second plurality of memory slots to correlate movement of the input device with respect to the underlying surface when in the second mode of operation, according to certain embodiments. As indicated above, using more memory slots may be advantageous for improving image correlation between memory pages, but may also require additional computational resources. To control power consumption, some embodiments may use fewer memory slots in the second mode of operation. As such, in some exemplary embodiments, the second plurality of memory slots (in the second mode of operation) can include three or less (e.g., 2-3) memory slots.

At step 770, method 700 can include communicating with a host computing device via a first communication protocol when in the first mode of operation, according to certain embodiments. The first communication protocol may operate at a first report rate of less than 5 ms per report. In certain exemplary embodiments, the first communication protocol can be 1 ms per report. The report rate refers to how often the input device reports user inputs (e.g., button presses, input device movement, etc.) to a corresponding host computer. Generally, high performance operation (e.g., frame rates of 10 KHz-15 KHz) are paired with fast report rates to prevent "bottlenecking" or causing unnecessary lag in input device performance. This may be due to speed and resolution that might become a bottleneck with USB report rates of 8 ms. Even at a 1 kHz frame rate, sensor processing is typically fast enough to still deliver the amount of motion within the same time (ms range) as the observation has been made.

At step 775, method 700 can include communicating with a host computing device via a second communication protocol when in the second mode of operation, according to certain embodiments. The second communication protocol may operate at a second report rate of greater than 5 ms per report. In some exemplary embodiments, the second communication protocol can be 8 ms per report (e.g., for a proprietary RF wireless protocol). Alternatively or additionally, some embodiments may use a second communication protocol operating at 11.25 ms per report (e.g., for BLE). In some cases, proprietary second communication protocols may be advantageous as they may provide faster report rates and, in some cases, lower power consumption than certain standard communication protocols (e.g., BLE), but may further require specialized transceivers (e.g., "dongles"). One of ordinary skill in the art would understand the many variations, modifications, and alternative embodiments thereof.

It should be appreciated that the specific steps illustrated in FIG. 7 provide a particular method 700 for establishing a wireless connection with a mobile input device, according to certain embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. For example, in some embodiments, resolution settings can be preset by a user and later retrieved when toggling between modes. For instance, in office mode the resolution setting can be set to relatively high value (e.g., 1200 dpi) and gaming made may have a lower dpi (e.g., 400 dpi). Alternatively, a resolution setting could control the mode selection. For example, setting 1200 dpi may set the input device in the office mode, and setting to 400 dpi could set the input device to gaming mode. One of ordinary skill in the art would understand the many variations, modifications, and alternative embodiments thereof.

Furthermore, additional steps may be added or removed depending on the particular applications. For example, some embodiments may change pixel array size and the frame rate algorithm, but not change the number of memory slots or communication protocol as the input device is switched between the first and second modes of operation. Some embodiments may change the frame rate and memory slots, but not the communication protocol or pixel array size between modes of operation. Further embodiments may only use one of the four modifications (e.g., only changing the size of the pixel array). Some embodiments may introduce other modifications between modes of operation. For example, LED drive current may be higher in gaming mode than in office mode. Any combination of changes can be used and one of ordinary skill in the art with the benefit of this disclosure would understand the many variations, modifications, and alternative embodiments thereof. This concept is represented in FIG. 7 by the inclusion of dashed lines around certain method steps. For example, steps 750-775 are shown in dashed lines, which suggests that those steps may be optional. While this representation appears to suggest that changing the number of pixels between modes of operation is fixed, while the others (e.g., changing the number of memory slots) are optional, it should be understood that this is merely one possibility and any combination is possible, as thoroughly discussed above.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input device comprising:
   a housing;
   an imaging sensor coupled with the housing, the imaging sensor including an optical pixel array and the imaging sensor configured to detect one or more images of an underlying surface to the input device;
   one or more processors coupled to the housing and the imaging sensor, the one or more processors configured to track, based on the one or more images, movement of the input device with respect to the underlying surface;
   a power storage component coupled to the housing, wherein the imaging sensor and the one or more processors are powered via the power storage component;
   wherein the input device is configured to selectively operate in one of two modes of operation including:
   a first mode of operation wherein a first plurality of pixels in the optical pixel array are used when tracking the movement of the input device with respect to the underlying surface; and
   a second mode of operation wherein a second plurality of pixels in the optical pixel array are used when tracking the movement of the input device with respect to the underlying surface,
   wherein the second plurality of pixels has fewer pixels used than the first plurality of pixels for the tracking of the movement of the input device; and
   wherein the second mode of operation is characterized in that less power is consumed by the input device from the power storage component as compared to the first mode of operation for the tracking of the movement of the input device.

2. The input device of claim 1 wherein the first mode of operation and the second mode of operation are user selectable.

3. The input device of claim 2 wherein the input device further comprises an input element configured to be actuated by a user of the input device and wherein the input device is configured to selectively operate in the first mode or the second mode in response to actuation of the input element.

4. The input device of claim 1 wherein the optical pixel array is configured to power a first number of pixels of the optical pixel array to provide optical data for the one or more images in the first mode of operation and to power a second number of pixels of the optical pixel array to provide optical data for the one or more images in the second mode of operation, the powered second number of pixels being less than the powered first number of pixels.

5. The input device of claim 1, the one or more processors are configured to use the first plurality of pixels for the tracking of the movement of the input device in the first mode of operation and the second plurality of pixels for the tracking of the movement of the input device in the second mode of operation.

6. The input device of claim 1 wherein the power storage component is a battery or capacitor that is configured to be periodically charged from an external power source to the input device and wherein the imaging sensor and the one or more processors are configured to be powered by the power storage component when the external power source is not coupled to the input device to charge the power storage component.

7. The input device of claim 1 further comprising a wireless transceiver and wherein the one or more processors are configured to:
- in the first operating mode, report the tracking of the movement of the input device to an external device at a first report rate; and
- in the second operating mode, report the tracking of the movement of the input device to the external device at a second report rate, wherein the first report rate is higher than the second report rate.

8. The input device of claim 7, wherein the second mode of operation is characterized in that less power is consumed by the input device from the power storage component as compared to the first mode of operation for reporting the tracking of the movement of the input device to the external device.

9. The input device of claim 1 wherein the tracking of the movement of the input device with respect to the underlying surface is characterized by a frame rate,
- wherein when in the first mode of operation, the frame rate operates over a first range of frequencies, and
- wherein when in the second mode of operation, the frame rate operates over a second range of frequencies, wherein the second range of frequencies has a narrower bandwidth than the first range of frequencies.

10. The input device of claim 1 wherein when in the first mode of operation, a first plurality of memory slots are used to correlate movement of the input device with respect to the underlying surface,
- wherein when in the second mode of operation, a second plurality of memory slots are used to correlate movement of the input device with respect to the underlying surface,
- wherein the first plurality of memory slots is a greater number of memory slots than the second plurality of memory slots.

11. A method for operating an input device, the method comprising:
- controlling, by one or more processors of the input device, an imaging sensor disposed in the input device to track a movement of the input device with respect to an underlying surface, the imaging sensor including an optical pixel array, wherein the one or more processors and the imaging sensor are powered by a power storage component of the input device;
- receiving, at the one or more processors, an input signal to place the input device in one of a first mode of operation or a second mode of operation;
- in response to the input signal indicating to place the input device in the first mode of operation, using a first plurality of pixels in the optical pixel array when tracking the movement of the input device with respect to the underlying surface;
- in response to the input signal indicating to place the input device in the second mode of operation, using a second plurality of pixels in the optical pixel array when tracking the movement of the input device with respect to the underlying surface;
- wherein the second plurality of pixels has fewer pixels than the first plurality of pixels; and
- wherein the second mode of operation is characterized in that less power is consumed by the input device from the power storage component as compared to the first mode of operation for the tracking of the movement of the input device.

12. The method for operating an input device of claim 11 wherein the first mode of operation and the second mode of operation are user selectable.

13. The method for operating an input device of claim 12 wherein the input device further comprises an input element configured to be actuated by a user of the input device and wherein the input signal to place the input device in one of a first mode of operation or a second mode of operation is received in response to actuation of the input element.

14. The method for operating an input device of claim 11 wherein the optical pixel array is configured to power a first number of pixels of the optical pixel array to provide optical data for the tracking of the movement of the input device in the first mode of operation and to power a second number of pixels of the optical pixel array to provide optical data for the tracking of the movement of the input device in the second mode of operation, the powered second number of pixels being less than the powered first number of pixels.

15. The method for operating an input device of claim 11, the one or more processors are configured to use the first plurality of pixels for the tracking of the movement of the input device in the first mode of operation and the second plurality of pixels for the tracking of the movement of the input device in the second mode of operation.

16. The method for operating an input device of claim 11 wherein the power storage component is a battery or capacitor that is configured to be periodically charged from an external power source to the input device and wherein the imaging sensor and the one or more processors are configured to be powered by the power storage component when the external power source is not coupled to the input device to charge the power storage component.

17. The method for operating an input device of claim 11 further comprising:
- by the one or more processors via a wireless transceiver coupled to the input device:
  - in the first operating mode, reporting the tracking of the movement of the input device to an external device at a first report rate; and
  - in the second operating mode, reporting the tracking of the movement of the input device to the external device at a second report rate, wherein the first report rate is higher than the second report rate.

18. The method for operating an input device of claim 17, wherein the second mode of operation is characterized in that less power is consumed by the input device from the power storage component as compared to the first mode of operation for reporting the tracking of the movement of the input device to the external device.

19. The method of claim 11 wherein tracking the movement of the input device includes operating the imaging sensor according to a frame rate,
- wherein when in the first mode of operation, the method further comprises operating the frame rate over a first range of frequencies, and
- wherein when in the second mode of operation, the method further comprises operating the frame rate over a second range of frequencies, the first range of frequencies being different from the second range of frequencies.

20. The method of claim 11 further comprising:
- when in the first mode of operation, utilizing a first plurality of memory slots to correlate movement of the input device with respect to the underlying surface, and
- when in the second mode of operation, utilizing a second plurality of memory slots to correlate movement of the input device with respect to the underlying surface, wherein the first plurality of memory slots is a greater number of memory slots than the second plurality of memory slots.

* * * * *